(No Model.) 3 Sheets—Sheet 2.
J. M. POPE.
COMBINED PLANTER AND FERTILIZER DISTRIBUTER.
No. 380,929. Patented Apr. 10, 1888.
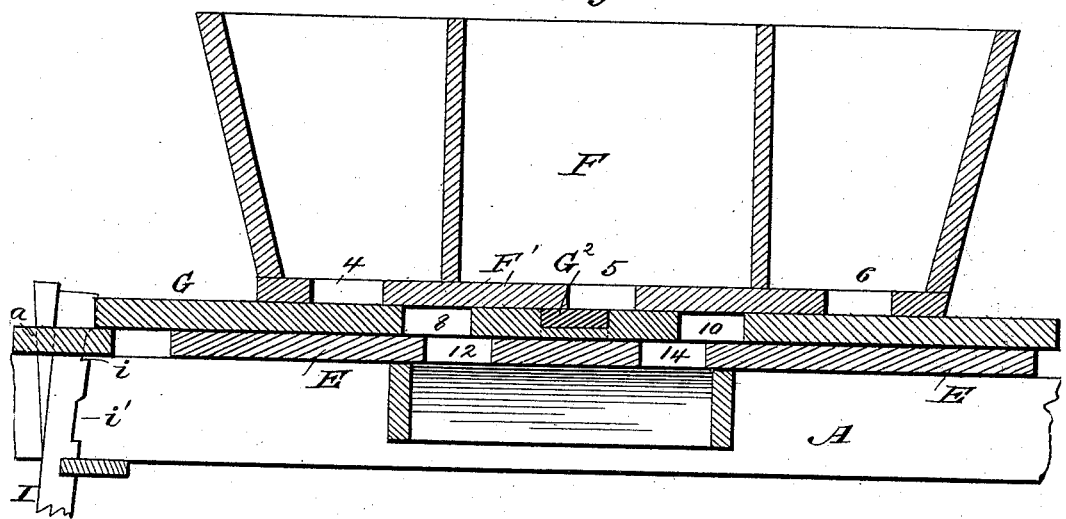
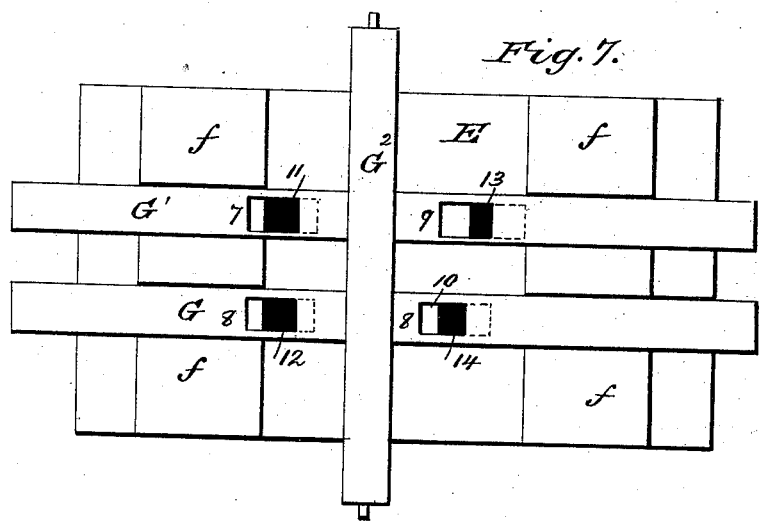
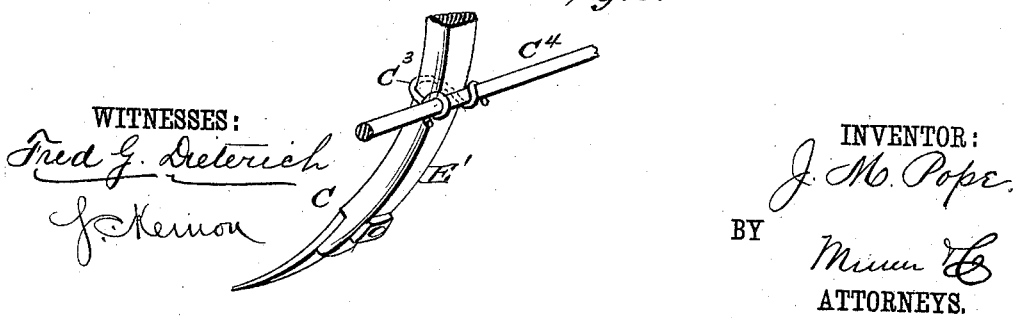
WITNESSES:
Fred G. Dieterich
J. C. Kernon
INVENTOR:
J. M. Pope
BY
Munn & Co.
ATTORNEYS.

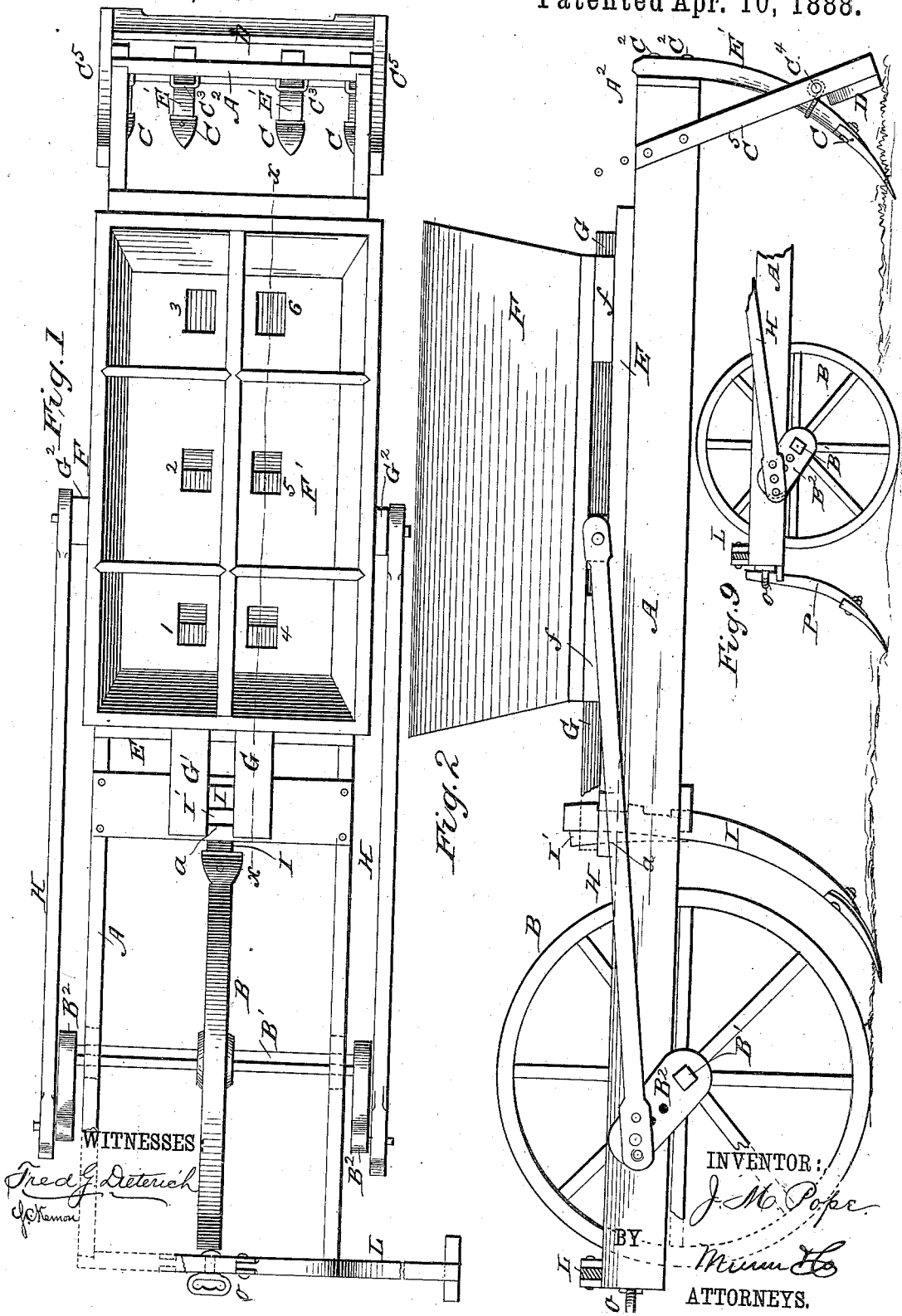

(No Model.) 3 Sheets—Sheet 3.

J. M. POPE.
COMBINED PLANTER AND FERTILIZER DISTRIBUTER.

No. 380,929. Patented Apr. 10, 1888.

WITNESSES:
Fred G. Dieterich.
J. C. Kernon.

INVENTOR:
J. M. Pope.
BY Munn & Co.
ATTORNEYS.

UNITED STATES PATENT OFFICE.

JAMES MADISON POPE, OF CANTON, MISSISSIPPI, ASSIGNOR OF PART TO RHEUBEN WILLIAM GARRISON, OF SAME PLACE, AND WILLIAM CLANTON JOYNER, OF MADISON COUNTY, MISSISSIPPI.

COMBINED PLANTER AND FERTILIZER-DISTRIBUTER.

SPECIFICATION forming part of Letters Patent No. 380,929, dated April 10, 1888.

Application filed August 15, 1887. Serial No. 247,046. (No model.)

*To all whom it may concern:*

Be it known that I, JAMES MADISON POPE, of Canton, in the county of Madison and State of Mississippi, have invented a new and useful Improvement in a Combined Planter and Fertilizer-Distributer, of which the following is a specification.

My invention relates to a combined machine for planting small grain—corn or cotton—for distributing fertilizer, and for covering the seed and fertilizer after they have been deposited in the ground; and the improvement consists in certain constructions and combinations of parts, hereinafter described, and particularly designated in the claims.

Figure 4:
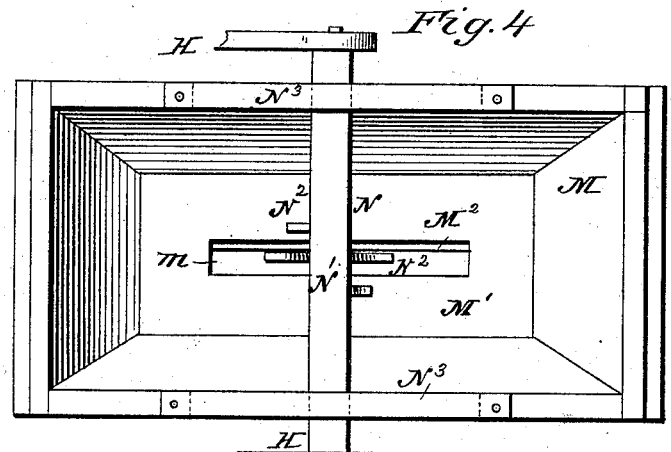
Figure 5:
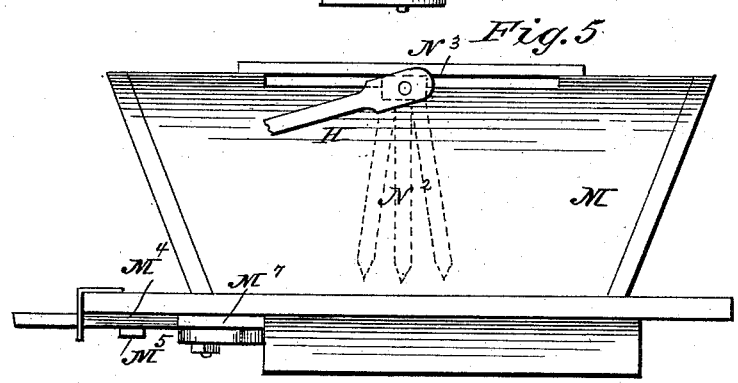
Figure 6:
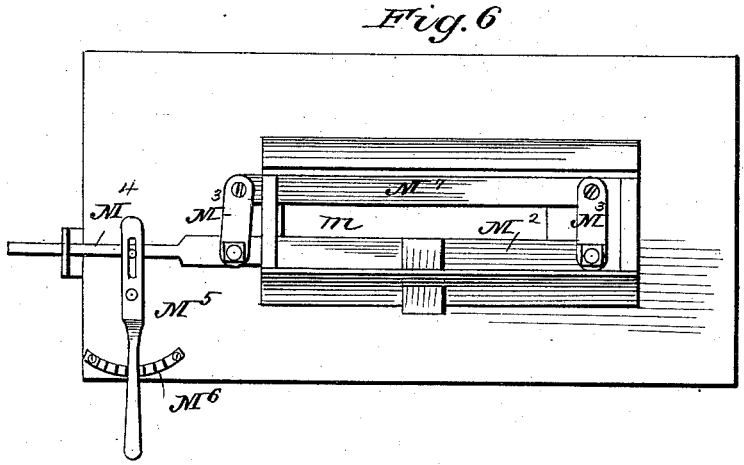

In the accompanying drawings, Figure 1 is a plan of my invention when used as a corn or grain planter and fertilizer - distributer; Fig. 2, a side elevation of the same with the clod-crusher attached; Fig. 3, a longitudinal section in the line $x\ x$ of Fig. 1, enlarged; Fig. 4, a plan of the fertilizer-distributing attachment; Fig. 5, a side elevation; Fig. 6, an inverted plan of the attachment shown in Fig. 4. Fig. 7 is a plan of the bed-plate and slides in enlarged detail; Fig. 8, a perspective of one of the covering-shovels; and Fig. 9, a side elevation, upon a reduced scale, of the forward end of the plate, showing the furrow-opening plow.

A rectangular frame, A, is supported at its forward end upon a wheel, B, and axle B', and is supported at its rear end by a row of covering-shovels, C, secured thereto, and a covering-board, D, supported thereon, as hereinafter described.

A bed-plate, E, is bolted to the frame A and supports a hopper, F, the bottom F' of which is raised a suitable distance above the bed-plate E by blocks $f$ to allow the slides G G' to reciprocate freely and fill the space between the bottom F' and bed-plate E. A cross-bar, $G^2$, connects the slides G G' and is reciprocated with them by pitmen H H, connecting cranks $B^2$ $B^2$ upon the axle B' with the ends of the said cross-bar.

The hopper F is divided into compartments, each of which is provided, respectively, with oppositely-located apertures. (Represented by the numerals from 1 to 6, inclusive.) The slides G G' are each provided with oppositely-located apertures 7 and 8 upon one side of the cross-bar $G^2$, and similar apertures, 9 and 10, upon the other side of said cross-bar. Oppositely-located apertures 11 and 12 in the forward end of the bed-plate E, and similar openings, 13 and 14, located one slightly in advance of the other in the rear end of bed-plate E, permit the seed or material in the hopper F to first fall through the several openings from 1 to 6, inclusive, and then fall into the openings in the seed-slides and be carried first forward and then backward from the seed-hopper apertures to the four apertures in the bed-plate E. By this means eight separate deposits of seed may be passed through the four apertures in the slide-plate E at each revolution of the drive-wheel B, and, being arranged in pairs, the machine is adapted to plant two kinds of grain—such as corn and peas—or to plant corn and a dry fertilizer in the grain-rows.

Corn or other seed may be planted at from one to four feet between the hills, as regulated by dropping from one or more of the four compartments in the seed box or hopper. A furrow-opener, I, notched at $i\ i'$, passes through a hole, $a$, in the cross-bar A' of the frame, and a wedge, I', holds either one or the other of said notches securely locked within the hole $a$. The furrow-opener may thus be adjusted to penetrate to any required depth.

The covering-shovels C are bolted to curved standards E', secured at their upper ends by bolts $C^2$ to the rear cross-bar, $A^2$, of the frame, and connected at their lower ends a suitable distance above the shovels C by means of staples $C^3$ to a cross-bar, $C^4$, extending across the machine. The outer ends of the cross-bar $C^4$ are secured to diagonal brace-bars $C^5$, bolted to and depending from the frame, and to the lower ends of said brace-bars are bolted securely the ends of a smoothing-board, D.

The shovels C are curved and will clear themselves by pushing large sods into the water-furrow and leave the ground in a state of cultivation, and the board D will smooth down the ridges and cover up the seed completely. By means of a check-marker, L, across the machine each row will be properly marked. The hopper F, together with the slide-plate and their connections, is removed from the frame when it is desired to plant small grain or cotton, and the hopper M is secured to the frame instead thereof. The bottom M' of the hopper M has a longitudinal slot, $m$, which is covered beneath by plate $M^2$, hinged at its ends to links $M^3 M^3$.

The plate $M^2$ has a stem, $M^4$, projecting from it, which is moved backward and forward by a hand-lever, $M^5$, pivoted to the under side of the hopper and secured to a segment-plate, $M^6$, to adjust the plate $M^2$ at any required distance from a corresponding plate, $M^7$, upon the opposite side of the said slot. The slot or opening $m$ may thus be enlarged or reduced in area to drill small seed or cotton-seed more or less freely. An agitator, N, having a cross-bar, N', and dependent fingers $N^2$, is supported at its ends to slide upon the top edge of the hopper M beneath the guide-plates $N^3$. The outer ends of the cross-bar N' are connected to the ends of the pitmen H H, and the agitator is thus reciprocated within the hopper to push the cotton-seed through the slot $m$ and to distribute the seed uniformly in the hopper.

A clevis, $o$, at the forward end of the machine permits the draft attachment to be raised or lowered upon the frame in a well-known manner, and a furrow-opening plow, P, is affixed to the forward end of the cultivator-frame in advance of the wheel B.

The pins in cranks $B^2$ may be moved nearer to or farther from the axle to vary the stroke of the slide-plate E, and thus regulate the amount of grain sown by the drill.

I claim as my invention and desire to secure by Letters Patent—

1. In a planter, the combination, with the frame, of a drive-wheel supported upon a double-cranked axle, the seed-hopper F, provided with a series of compartments each having in its bottom a seed-opening, said hopper also having a bottom, F', provided with a series of seed-openings, a bed-plate, E, also provided with a series of seed-openings, two seed-slides, G G', each connected intermediately of its length to a cross-bar, $G^2$, and having seed-openings one upon opposite sides of said cross-bar, and pitmen for connecting the ends of the cross-bar with the cranks of the axle, substantially as described.

2. In a planter, the combination, with the frame A, of the drive-wheel B, crank-axle B', hopper F, having double set of openings 1 2 3 4 5 6 in the bottom thereof, the slides G G', openings at 7 8 9 10, the slide-plate E, having openings 11 12 13 14, and means for reciprocating the slides between the bottom of the hopper and the slide-plate, substantially as described.

3. In a planter, the combination, with the frame A, of the drive-wheel B, double-crank axle B', hopper F, provided with a series of compartments each having in its bottom a seed-opening, said hopper also having seed-openings in the bottom, the bed-plate E, provided with seed-openings, the slide-plates G G', fitted in channels in the slide-plate and connected with a cross-bar, $G^2$, said plates G G' also having seed openings, one in each of which plates being arranged upon opposite sides of said cross-bar, and pitmen H, located upon opposite sides and outside of the machine-frame and connecting the ends of said cross-bar $G^2$ with the cranks upon the ends of the axle, substantially as described.

4. The combination, with the frame of a planter, of the drive-wheel B, furrow-opener I, seed-hopper F, slide G, driven from the wheel B, a series of covering-shovels, C, supported at the rear end of the frame, and a board, D, secured by diagonal braces to the frame and to the shovels C in rear thereof to brace them, substantially as described.

5. The combination, with the frame of a planter, of the furrow-opening and seed-dropping devices, a series of covering-shovels, C, secured at their upper ends to the frame in rear of the seed dropper and at their lower ends to a cross-bar, $C^4$, and a diagonal brace-bar, $C^5$, connecting the frame with said cross-bar, substantially as described.

JAMES MADISON POPE.

Witnesses:
CHAS. M. ANDERSON,
C. W. ANDREWS.